United States Patent [19]

Pontarollo

[11] 4,263,827

[45] Apr. 28, 1981

[54] APPARATUS FOR THE LONGITUDINAL CUTTING OF A TAPE OF SHEET MATERIAL CONTINUOUSLY FED

[76] Inventor: Ettore Pontarollo, Via Panzeri 13, Bresso (Milan), Italy

[21] Appl. No.: 94,871

[22] Filed: Nov. 16, 1979

[30] Foreign Application Priority Data

Nov. 20, 1978 [IT] Italy ............................... 29950 A/78

[51] Int. Cl.$^3$ .......................... B23D 31/00; B26D 1/22

[52] U.S. Cl. ........................................ 83/482; 83/495; 83/507; 83/922

[58] Field of Search ................. 83/495, 505, 506, 434, 83/922, 482, 507

[56] References Cited

U.S. PATENT DOCUMENTS 3,576,147 4/1971 Kerr, Jr. ........................... 83/506 X

*Primary Examiner*—J. M. Meister

*Attorney, Agent, or Firm*—Cushman, Darby & Cushman

[57] ABSTRACT

An apparatus for the longitudinal cutting into stripes of a tape of sheet material fed to be forwarded continuously while it is pinched between a blade and a counter-blade; said blade is a circular disc idly pivoted on a first supporting structure and said counter-blade is a ball supported to turn about its own center by a second supporting structure.

6 Claims, 3 Drawing Figures

APPARATUS FOR THE LONGITUDINAL CUTTING OF A TAPE OF SHEET MATERIAL CONTINUOUSLY FED

The present invention relates to important improvements in apparatus used to cut longitudinally into stripes a continuously fed tape of sheet material.

As an example given without limitation one may mention a tape of paper to be printed or already printed that is continuously fed along a rotary printing press.

Apparatus of that kind should meet some main requirements.

First of all it should cut the material without producing any dust or powder.

Then the cutting tools should be made in such a way as to be subject to wear as little as possible and so that they may be replaceable easily and quickly so as to reduce to a minimum the stopping time of the plant.

Moreover it is desirable that the cutting tools should be adjustable in position while the plant is in operation.

In addition, since such plants are generally in operation 24 hours a day, the consumption of such cutting tools is comparatively heavy, which makes their cost become important. As a matter of fact, before replacing them, they are regenerated a number of times, which at any rate involves an always costly recourse to skilled or semi-skilled labour.

In an attempt at satisfying the various requirements listed above, which are even in contrast to one another, various cutting devices were suggested.

One example is described and illustrated in U.S. Pat. No. 2,400,527. It comprises a circular blade and a counter-blade, between which blades the tape to be cut is pinched. The counter-blade consists of a cylinder driven to turn about its own longitudinal axis and contemporaneously to shift with alternate motion along the same axis. In that way the blade and counter-blade undergo wear in a uniform manner and there is avoided the formation of a circumferential track on the counter-blade, as instead happens if the blade always falls on the same point of a counter-blade that cannot be shifted by a reciprocating motion.

The structure mentioned however has not proved to be quite satisfactory. As a matter of fact, the cylinder counter-blade is driven to rotate positively and it is the very counter-blade that drives the tape to be cut. As a consequence the peripheral speed of rotation of the counter-blade is by way of a mutual unavoidable slipping with the tape always greater than the forwarding speed of the latter. The peripheral speed of rotation of the circular blade instead is substantially equal to that of the driven counter-blade, with which the said blade is at operative contact. This difference, though small, between the speed of rotation of the blade and counter-blade assembly and the feeding speed of the tape causes grinding of the latter with a considerable and undesirable production of dust.

Another bad inconvenience comes from the fact that the cylinder counter-blade is driven, namely that the feeding speed of the tape strictly depends on the peripheral speed of the cylinder and, therefore, on the diameter thereof. Hence grinding carried out on the driven cylinder counter-blade influences the feeding speed of the tape, which obviously is an undesirable thing.

A further inconvenience of the apparatus according to U.S. Pat. No. 2,400,527 derives from the system of transmission of the axial reciprocating motion to the counter-blade cylinder. In the apparatus in question, in fact, the frequency of the reciprocating motion of the counter-blade cylinder strictly depends on its speed of rotation. To a variation of the speed of rotation of the cylinder there corresponds a proportional change of its frequency of reciprocating axial shift.

To obviate the aforesaid inconveniences of the apparatus according to the U.S. Pat. No. 2,400,527 the machine described and illustrated in Italian Pat. No. 1,003,586 was proposed. In said machine the cylinder counter-blade is idle and is put to rotation by the very tape, which is driven by a suitable drive unit provided downstream. Consequently, the peripheral speed of rotation of the blade and counter-blade assembly is substantially equal to the feeding speed of the tape. In that way no grinding of the tape occurs and the tape is cut without any appreciable formation of dust. Moreover the grinding of the idle cylinder, which diminishes its diameter does not influence by any means the speeding feed of the tape.

In addition, with the apparatus according to Italian Pat. No. 1,003,586, the reciprocating axial shift of the cylinder is driven by a distinct geared motor assembly, which does not act in any manner on its speed of rotation which exclusively depends on the speed of the tape.

This apparatus has proved to be capable of cutting the material without producing any dust. However its construction is still such as not to meet the requirements of low cost, long duration, easy and simple servicing and maintenance as well as replacing the blade and counter-blade assembly with short times of machine stoppage.

It is a general object of the invention to provide an apparatus equipment meeting the above mentioned requirements.

It is a further object of the instant invention to provide a counter-blade having so cheap a structure as to make it advantageous to replace worn out counter-blades with new ones instead of regenerating them by grinding and hardening.

According to the invention these objects are attained by an apparatus for the longitudinal cutting into stripes of a tape of sheet material fed continuously, between a blade and a counter-blade; characterized in that the said blade is a circular disc pivoted to idle, on a first supporting structure and in that the said counter-blade is a ball rotatably supported to turn about its own centre by a second supporting structure.

The structural and functional features of the invention and its advantages over the known state of the art will appear more fully evident on perusing the description hereinafter given by way of example with reference to the accompanying drawings in which.

With reference to the drawings, the subject cutting apparatus comprises a blade 10 and a counter-blade 11 between which there is pinched a tape 12 to be longitudinally cut into stripes.

Figure 1:
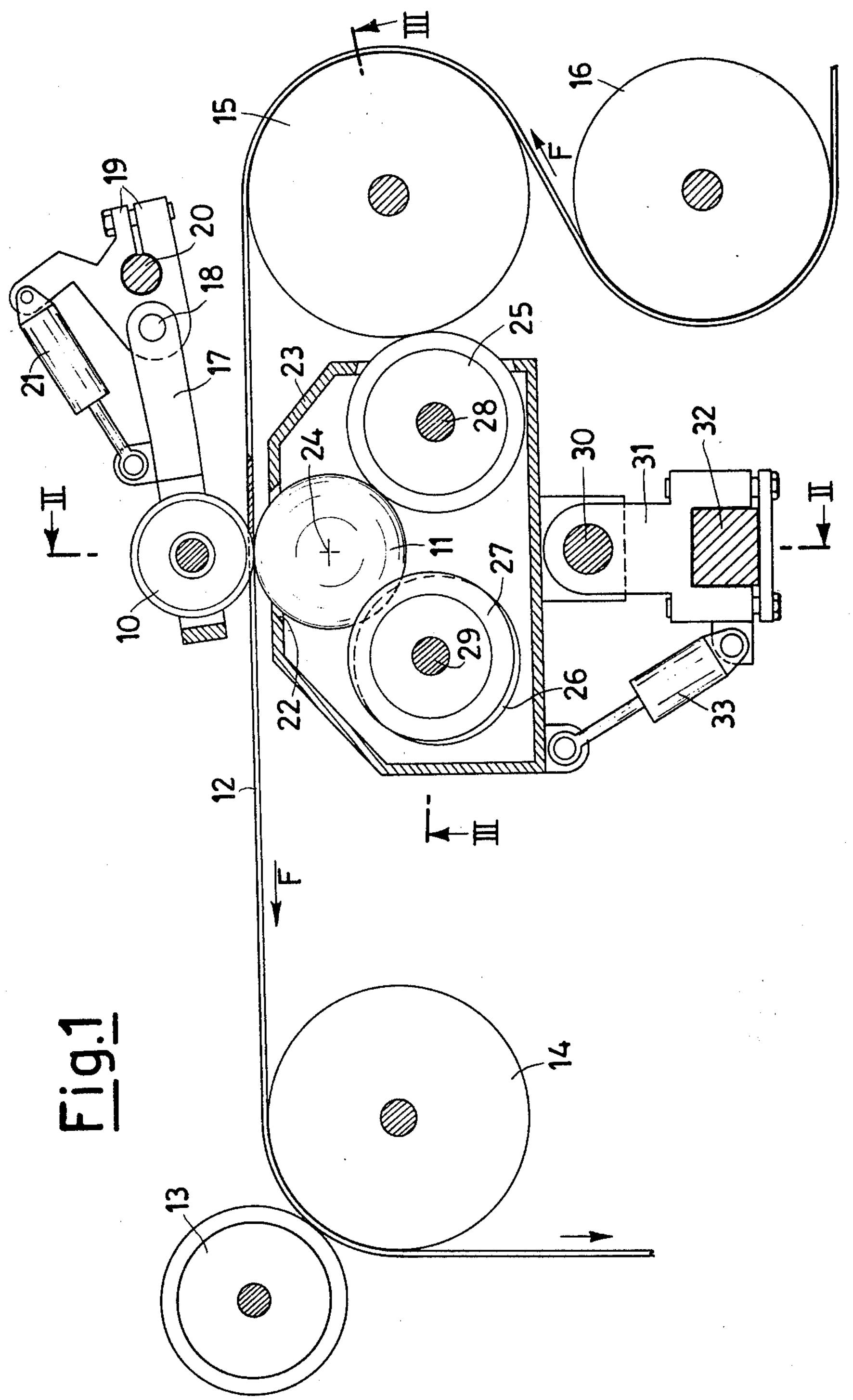
FIG. 1 is a diagrammatical view of a longitudinal section showing an apparatus embodying the invention.
Figure 2:
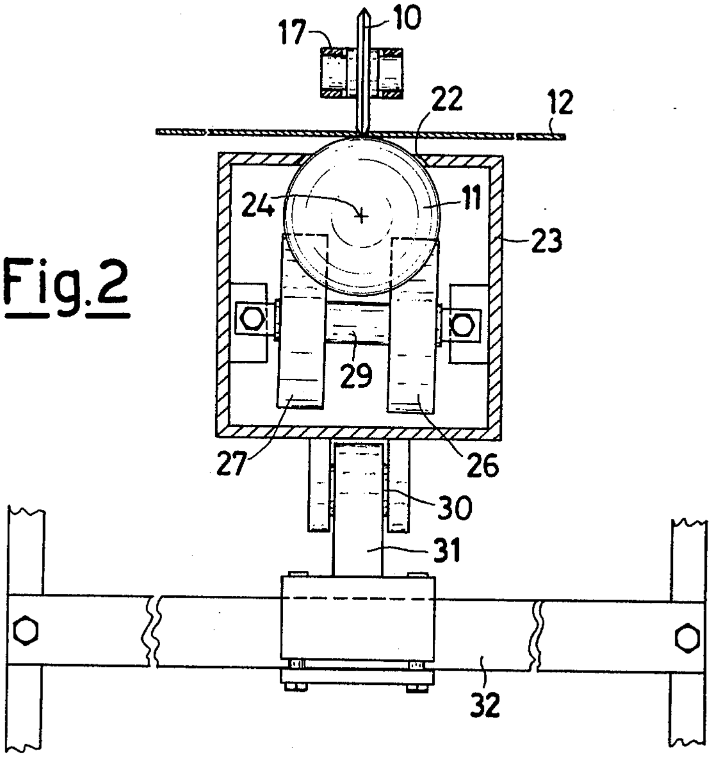
FIG. 2 is a section taken along the line II—II of FIG 1.

The tape 12, e.g. a paper tape coming from a rotary printing press is continuously fed in the direction of arrow F of FIG. 1 by a drive assembly composed of a motorized cylinder 13 and of a counter-cylinder 14, both placed downstream the apparatus; the tape 12 is wound in S-shape about a couple of idling cylinders 15, 16, put to rotation by the feeding movement of the very tape 12.

The blade 10 is a circular disc pivoted to idle about an axis passing through its centre, at one end of an arm 17 that is pivoted at the opposite end, at 18, on a vice 19 clamped adjustably in position, along a supporting bar 20. A pneumatic cylinder 21 interconnects by articulation the blade carrying arm 17 with the body of said vice 19.

According to the present invention the counter-blade 11 is a ball of hardened steel partly projecting from an opening 22 of a supporting box 23. In particular, the ball 11 is encaged but freely rotatable about its own centre 24, between the opening 22 of smaller diameter and three tired wheels 25, 26 and 27 which embrace it at three points.

The wheel 25 is idly rotatable about the axis 28, it projects in part from the box 23 and is in frictional contact with the cylinder 15 that drives it.

The wheels 26, 27 are idly rotatable about the same axis 29, which is slightly skew with respect to the plane containing the wheel 25 and passing through the centre 24 of the ball 11.

The box 23 is pivoted at 30 on a slide 31 fixed adjustably in position to a supporting beam 32. A pneumatic cylinder 33 interconnects by articulation the said box 23 with the slide 31.

Operation of the cutting apparatus above described is as follows.

The paper tape 12 drives the idle cylinder 15 while adequately winding up around it; the cylinder 15 drives the tired wheel 25, which drives the ball 11, which in turn drives both the tired wheels 26 and 27 and the circular blade 10. Hence the peripheral speed of the ball is substantially equal to the speed of the paper.

The assembly of the ball, and of the tired wheels, or counter-blade is pivoted on the axis 30 and is pushed against the cylinder 15 by the pneumatic cylinder 33 the pressure of which is adjustable.

The circular blade 10 bears orthogonally against the surface of the ball 11 and receives an adjustable pressure from the pneumatic cylinder 21.

Figure 3:
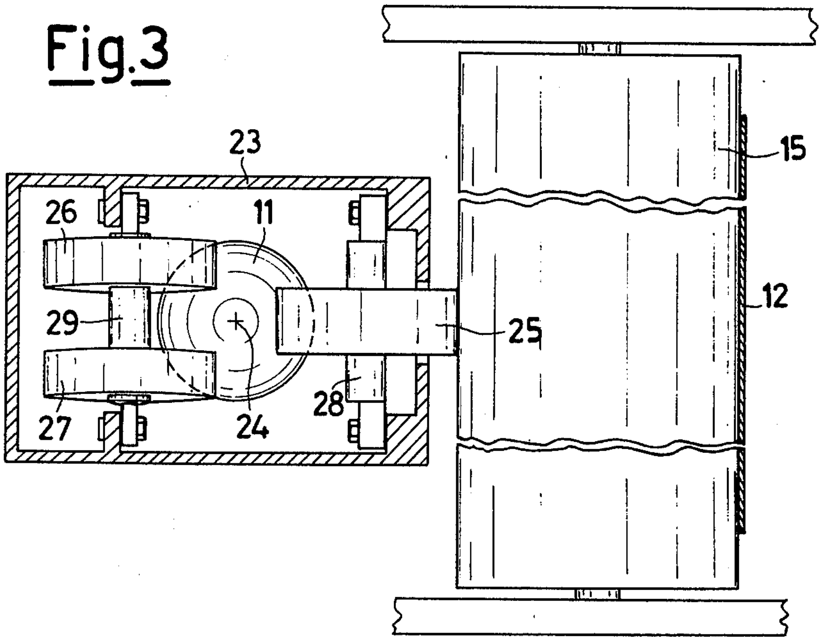
FIG. 3 is a section taken along the line III—III of FIG. 1.

In passing between the blade and the ball acting as a counter-blade, the paper is cut; this cut is not so much a cut, but rather a split since the blade 10 being wedge-shaped (double-bevel) (FIG. 3) and working on a spherical basis splits the paper tape dividing it into two parts; this means elimination of dust also because both the blade and the ball turn substantially at the same speed of the paper.

While the tired wheel 25 supports and drives the ball 12, the tired wheels 26 and 27 support and guide the same ball. As will be seen, again in FIG. 3, the ball bearing against the internal side of the wheels 26 and 27, cannot shift laterally.

The wheels 26 and 27 turn independently of one another and are mounted on the same axis 29.

Since the axis 29 is slightly sloping, the ball is provided also with a very slight secondary rotation about an axis not orthogonal to the vertical plane of FIG. 1 and consequently the point in which the blade bears against the ball describes in operation the whole surface thereof. The duration of the ball and the quality of the cut thus become considerable.

The paper tape can be cut in any point very easily while displacing laterally, even while the machine is in operation, the blade on the supporting round bar 20 and the ball on the square supporting beam 32.

Another advantage of the invention is that, contrarily to all other cutting systems, the replacement of the component parts can be done very quickly and that the ball if worn out may be eliminated as a waste since its cost is extremely low.

Although the invention has been illustrated and described in detail with reference to a specific embodiment thereof, it will be understood that variants and modifications are possible within the scope of the said invention.

I claim:

1. An apparatus for the longitudinal cutting into stripes of a tape of sheet material fed to be forwarded continuously while it is pinched between a blade and a counter-blade; characterized in that the said blade is a circular disc idly pivoted on a first supporting structure and in that the said counter-blade is a ball supported to turn about its own centre by a second supporting structure.

2. An apparatus according to claim 1, characterized in that the said second supporting structure comprises a cage composed of three wheels which embrace the ball at three points, the said three wheels being rotatably supported within a box from an aperture of which the ball partly projects.

3. An apparatus according to claim 2, characterized in that a first wheel of the said three wheels partly projects from said box and is at frictional contact with a cylinder driven in rotation by the tape which partly winds up about it, and in that the other two wheels turn on one common axis in positions opposed to the first wheel.

4. An apparatus according to claim 3, characterized in that the said axis is skew with respect to a plane containing the first wheel and the ball.

5. An apparatus according to claim 2, characterized in that the said box is pivoted on a slide fixed so as to be adjustable in position to a supporting beam, there being provided a pneumatic cylinder connecting by articulation the said box with the said slide.

6. An apparatus according to claim 1, characterized in that the said first supporting structure comprises an arm at one end of which the said blade is pivoted and having the opposed end pivoted at a vice that can be fastened and adjustable in position on a supporting bar, there being provided a pneumatic cylinder connecting by articulation the said arm with the said vice.

* * * * *